United States Patent
Deville

(10) Patent No.: US 8,586,507 B2
(45) Date of Patent: Nov. 19, 2013

(54) OIL BASED DRILLING FLUIDS WITH ENHANCED STABILITY AT HIGH TEMPERATURES

(75) Inventor: Jay Paul Deville, Spring, TX (US)

(73) Assignee: Halliburton Energy Services, Inc., Houston, TX (US)

(*) Notice: Subject to any disclaimer, the term of this patent is extended or adjusted under 35 U.S.C. 154(b) by 0 days.

(21) Appl. No.: 13/247,758

(22) Filed: Sep. 28, 2011

(65) Prior Publication Data

US 2012/0258893 A1   Oct. 11, 2012

Related U.S. Application Data

(62) Division of application No. 12/386,944, filed on Apr. 24, 2009, now Pat. No. 8,062,997.

(51) Int. Cl.
*C09K 8/22* (2006.01)

(52) U.S. Cl.
USPC .......... 507/131; 507/117; 507/120; 507/129; 507/137; 507/138

(58) Field of Classification Search
None
See application file for complete search history.

(56) References Cited

U.S. PATENT DOCUMENTS

| | | | |
|---|---|---|---|
| 6,527,051 B1 * | 3/2003 | Reddy et al. | 166/300 |
| 7,262,152 B2 | 8/2007 | Monfreux-Gaillard et al. | |
| 2003/0064897 A1 * | 4/2003 | Kirsner et al. | 507/100 |
| 2004/0259739 A1 * | 12/2004 | Monfreux-Gaillard et al. | 507/117 |
| 2005/0126785 A1 | 6/2005 | Todd | |
| 2006/0065396 A1 | 3/2006 | Dawson et al. | |
| 2006/0175059 A1 * | 8/2006 | Sinclair et al. | 166/283 |
| 2007/0039732 A1 | 2/2007 | Dawson et al. | |

* cited by examiner

*Primary Examiner* — John J Figueroa
(74) *Attorney, Agent, or Firm* — Craig W. Roddy; Karen B. Tripp

(57) ABSTRACT

Ester based drilling fluids with enhanced stability at high temperatures for drilling, running casing in, and/or cementing a borehole in a subterranean formation. The drilling fluids comprise a monomeric or polymeric carbodiimide hydrolysis inhibitor.

18 Claims, 2 Drawing Sheets

OIL BASED DRILLING FLUIDS WITH ENHANCED STABILITY AT HIGH TEMPERATURES

RELATED APPLICATION

This application is a division of, and claims priority from, U.S. Ser. No. 12/386,944, filed Apr. 24, 2009, now U.S. Pat. No. 8,062,997 B2, issued Nov. 22, 2011.

BACKGROUND OF THE INVENTION

1. Field of the Invention

The present invention relates to compositions and methods for drilling, cementing and casing boreholes in subterranean formations, particularly hydrocarbon bearing formations. More particularly, the present invention relates to oil or synthetic fluid based drilling fluids and fluids comprising invert emulsions, such as fluids using esters for example, which combine high ecological compatibility with good stability and performance properties.

2. Description of Relevant Art

A drilling fluid or mud is a specially designed fluid that is circulated through a wellbore as the wellbore is being drilled to facilitate the drilling operation. The various functions of a drilling fluid include removing drill cuttings from the wellbore, cooling and lubricating the drill bit, aiding in support of the drill pipe and drill bit, and providing a hydrostatic head to maintain the integrity of the wellbore walls and prevent well blowouts. Specific drilling fluid systems are selected to optimize a drilling operation in accordance with the characteristics of a particular geological formation.

Oil or synthetic fluid-based muds are normally used to drill swelling or sloughing shales, salt, gypsum, anhydrite or other evaporate formations, hydrogen sulfide-containing formations, and hot or high temperature (greater than about 300 degrees Fahrenheit ("° F.")) holes, but may be used in other holes penetrating a subterranean formation as well. Unless indicated otherwise, the terms "oil mud" or "oil-based mud" or "drilling fluid" shall be understood to include synthetic oils or other synthetic fluids as well as natural or traditional oils, and such oils shall be understood to comprise invert emulsions.

Oil-based muds used in drilling typically comprise: a base oil (or synthetic fluid) comprising the external phase of an invert emulsion; a saline, aqueous solution (typically a solution comprising about 30% calcium chloride) comprising the internal phase of the invert emulsion; emulsifiers at the interface of the internal and external phases; and other agents or additives for suspension, weight or density, oil-wetting, fluid loss or filtration control, and rheology control.

An oil-based or invert emulsion-based drilling fluid may commonly comprise between about 50:50 to about 95:5 by volume oil phase to water phase. An all oil mud simply comprises 100% liquid phase oil by volume; that is, there is no aqueous internal phase.

Invert emulsion-based muds or drilling fluids (also called invert drilling muds or invert muds or fluids) comprise a key segment of the drilling fluids industry. However, increasingly invert emulsion-based drilling fluids have been subjected to greater environmental restrictions and performance and cost demands. While ester based invert emulsion drilling fluids satisfy many environmental concerns, they tend to lose effectiveness or utility at high oilfield temperatures. There is consequently an increasing need and industry-wide interest in new drilling fluids and methods that provide improved performance while still affording environmental and economical acceptance.

SUMMARY OF THE INVENTION

The present invention provides improved methods of drilling wellbores in subterranean formations employing oil-based muds or drilling fluids. As used herein, the term "drilling" or "drilling wellbores" shall be understood in the broader sense of drilling operations, which include running casing and cementing as well as drilling, unless specifically indicated otherwise. More particularly, the present invention provides a method for improving the stability of oil-based drilling fluids, most particularly at high temperatures. The present invention also provides oil based drilling fluids having improved stability at such high temperatures.

Any drilling fluid comprising a hydrolysable component may benefit from the present invention. Esters and amides are particularly susceptible to hydrolysis and thus the invention is particularly advantageous with invert emulsion drilling fluids comprising esters and/or amides, particularly as the base oil for the drilling fluids but also as additives or components in the drilling fluids, such as for example, emulsifiers and fluid loss control additives. The benefits of the invention are obtained by inhibiting hydrolysis of esters and/or amides in or comprising the drilling fluid. Such benefits are particularly realized at higher temperatures, that is, at temperatures of 275° F. or higher and extending to temperatures as high as about 450° F. or more, as may be encountered in drilling boreholes in subterranean formations for recovery of hydrocarbons.

According to the method of the invention, a carbodiimide, preferably a polycarbodiimide, is added to the drilling fluid as a hydrolysis inhibitor. A 5 lb/bbl loading amount will typically be effective for purposes of the invention, although other amounts may be successfully used with experimentation. Drilling fluids of the invention comprise an ester oil or invert emulsion base and/or ester or amide additives, such as, for example, emulsifiers and fluid loss control additives, and a carbodiimide, or preferably a polycarbodiimide.

DETAILED DESCRIPTION OF PREFERRED EMBODIMENTS

Figure 1:
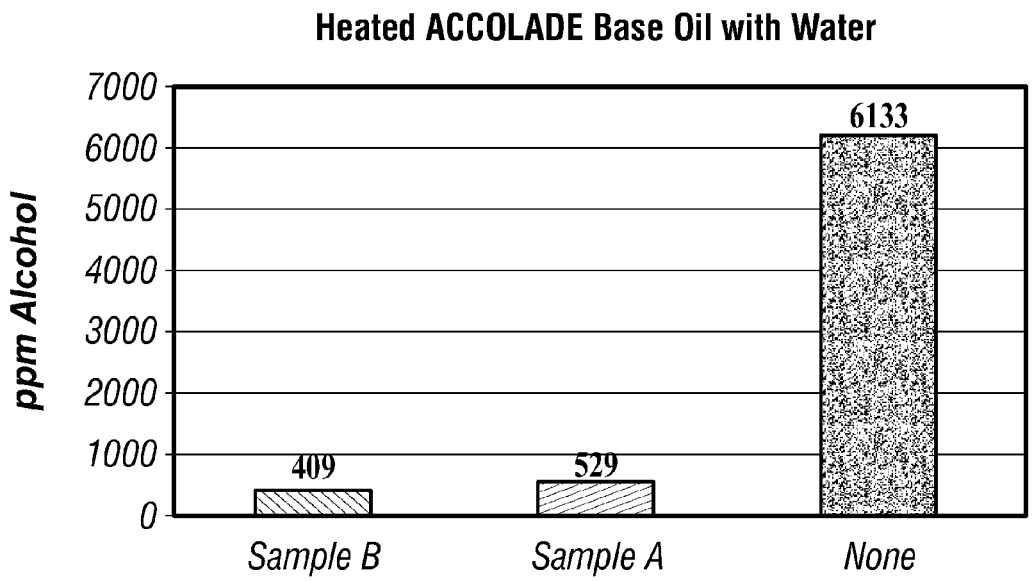
FIG. 1 is a graph comparing the amount of alcohol produced, indicating hydrolysis, in samples containing ester base and water, with and without polycarbodiimide additives, after heating at 370° F. for 16 hours.

Ester based invert emulsion drilling fluids are favored as oil based drilling fluids for environmental acceptability and regulatory compliance. However, in prior art fluids, the ester can be vulnerable to hydrolysis, particularly at high temperatures that can be encountered in drilling subterranean formations for the recovery of hydrocarbons. Such hydrolysis can result in breakdown of the fluid, which ultimately or eventually renders the fluid unusable as a drilling fluid. Consequently, the use of ester based drilling fluids is less common at high temperatures, which typically increase the rate of ester hydrolysis.

The addition of lime to a drilling fluid, as has been common practice in the oilfield, can have the negative side-effect of increasing the amount of hydrolysis of esters in prior art drilling fluids. Lime provides a greater concentration of nucleophilic hydroxide ion to the fluid, which can escalate hydrolysis. Consequently, lime is usually avoided in ester based drilling fluids.

The present invention provides a method for enhancing the stability of ester-based drilling fluids and drilling fluid additives, even at high temperatures, and even in the presence of lime or other sources of hydroxide ion. This enhancement is accomplished by reducing the amount of hydrolysis that occurs in oil-based drilling fluid systems. Hydrolysis inhibition according to the present invention allows for greater application of ester based drilling fluids in higher temperature environments with greater retention of desirable fluid properties.

In the method of the present invention, enhanced stability of ester based invert emulsion drilling fluids is obtained by adding to or including in the drilling fluid a carbodiimide, preferably a polycarbodiimide. The carbodiimide carbon is believed to be more reactive than the carbonyl carbon of an ester and hence the reaction of the carbodiimide with water or hydroxide (hydrolysis) is expected to be more facile than hydrolysis of the ester of the drilling fluid. Consequently, the reaction of the carbodiimide with the water or hydroxide prevents or inhibits the carbonyl carbon of the ester from reacting with the water or hydroxide that might otherwise hydrolyze the ester, resulting in the ester not becoming hydrolyzed. This is particularly significant, and surprising, in drilling fluids, and especially invert emulsion drilling fluids, because such fluids already contain water as part of their composition. The carbodiimide is nevertheless able to maintain effectiveness in enhancing the stability of the fluid over time, as for example for a time sufficient to drill one or more wells or subterranean boreholes. That is, the carbodiimide is not immediately "used up" or diluted to ineffectiveness upon placement into the fluid.

The effectiveness of the invention is demonstrated in the following experiments.

Experiment 1:

Since hydrolyzation of an ester causes part of the ester molecule to be lost as an alcohol, the effectiveness of hydrolysis inhibitors can be measured by monitoring the production of alcohol that is formed in ester hydrolysis. In the case of a state-of-the-art, ester-based, invert emulsion fluid sold by Halliburton Energy Services, Inc., in Houston, Tex. and Duncan, Okla. under the tradename ACCOLADE® drilling fluid, the amount of alcohol produced can be monitored by gas chromatography/mass spectrometry. Thus, samples containing ACCOLADE® base fluid, calcium chloride brine, and an emulsifier, were formulated with and without 5 lb/bbl loading of one of two commercial polycarbodiimides: the viscous liquid STABAXOL® P200 polycarbodiimide (Sample A) and the powder STABAXOL® P polycarbodiimide (Sample B), both available from Rhein Chemie Rheinau GmbH, Mannheim, Deutschlandas (Germany). The samples were static aged at 370° F. for 16 hours and then tested for alcohol content, as indicated in Table 1 below.

TABLE 1

| Additive | wt. % alcohol | ppm alcohol |
|---|---|---|
| Polycarbodiimide Sample A | 0.041 | 409 |
| Polycarbodiimide Sample B | 0.053 | 529 |
| None (Control) | 0.61 | 6133 |

The data is also graphed in FIG. 1. The data indicates that a greater than 90% reduction in the amount of alcohol produced was observed in the presence of the polycarbodiimides. This reduction indicates a reduction in the amount of hydrolysis of the ester in the ACCOLADE® base fluid.

Experiment 2:

Samples of the same compositions of Experiment 1 were static aged at 370° F. for 16 hours, 40 hours, 64, hours and 88 hours, and tested for alcohol content after each elapsed aging period, as shown in Table 2 below.

TABLE 2

| Additive | wt. % alcohol | ppm alcohol |
|---|---|---|
| Polycarbodiimide Sample A Static Aged 16 hours | 0.06 | 570 |
| Polycarbodiimide Sample B Static Aged 16 hours | 0.16 | 1588 |
| None (Control) Static Aged 16 hours | 0.59 | 5876 |
| Polycarbodiimide Sample A Static Aged 40 hours | 0.13 | 1333 |
| Polycarbodiimide Sample B Static Aged 40 hours | 0.33 | 3309 |
| None (Control) Static Aged 40 hours | 1.00 | 10005 |
| Polycarbodiimide Sample A Static Aged 64 hours | 0.34 | 3365 |
| Polycarbodiimide Sample B Static Aged 64 hours | 0.74 | 7373 |
| None (Control) Static Aged 64 hours | 1.25 | 12470 |
| Polycarbodiimide Sample A Static Aged 88 hours | 0.74 | 7398 |
| Polycarbodiimide Sample B Static Aged 88 hours | 1.34 | 13427 |
| None (Control) Static Aged 88 hours | 1.37 | 13749 |

Figure 2:
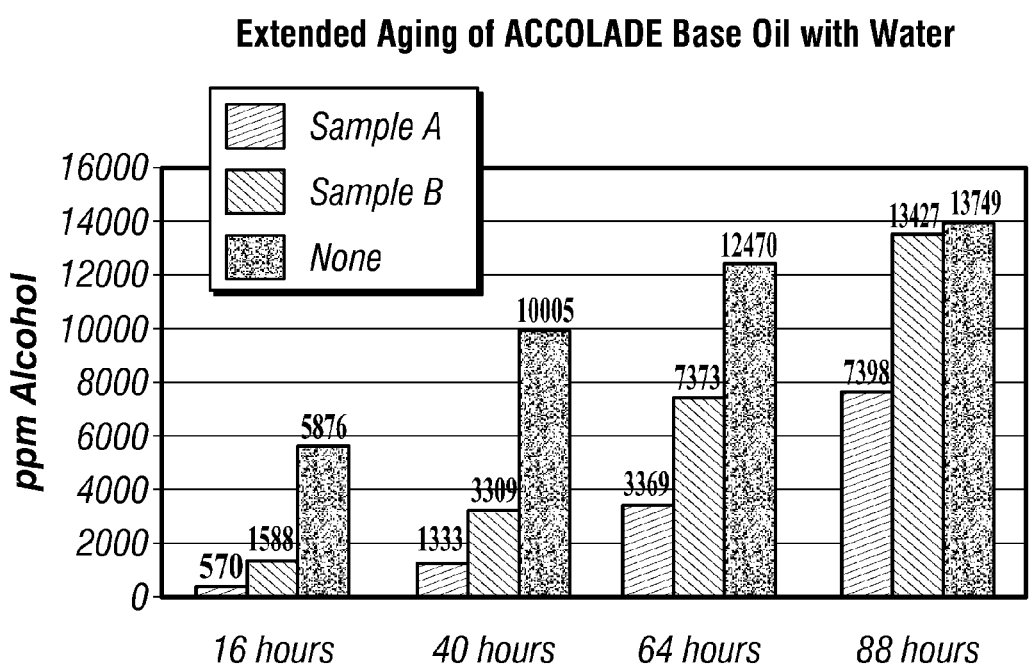
FIG. 2 is a graph comparing the amount of alcohol produced, indicating hydrolysis, in samples containing ester base and water, with and without polycarbodiimide additives, after heating at 370° F. for periods of 16 hours, 40 hours, 64 hours and 88 hours.

The data is also graphed in FIG. 2. The data indicates that after 64 hours, both polycarbodiimide additives still reduced the alcohol concentration, and after 88 hours, Additive A still showed the ability to reduce the amount of ester hydrolysis that occurred. The reason Additive A showed superior performance to Additive B is unclear, although the liquid nature of the material may have allowed the material to be more fully solubilized in the solids-free fluids tested in this experiment leading to greater efficacy.

Experiment 3:

Samples containing ACCOLADE® base, calcium chloride brine, and an emulsifier, were formulated with and without 5 lb/bbl loading of one of two commercial polycarbodiimides, STABAXOL® P200 and STABAXOL® P polycarbodiimides, available from Rhein Chemie Rheinau GmbH, Mannheim, Deutschlandas, as in Experiments 1 and 2, except to each of the samples for this Experiment 3 was added lime (3 lb/bbl). The samples were static aged at 370° F. for 16 hours and tested for alcohol content, as shown in Table 3.

TABLE 3

| Additive | wt. % alcohol | ppm alcohol |
|---|---|---|
| Polycarbodiimide Sample A | 0.64 | 6434 |
| Polycarbodiimide Sample B | 0.56 | 5556 |
| None (Control) | 0.98 | 9804 |

Figure 3:
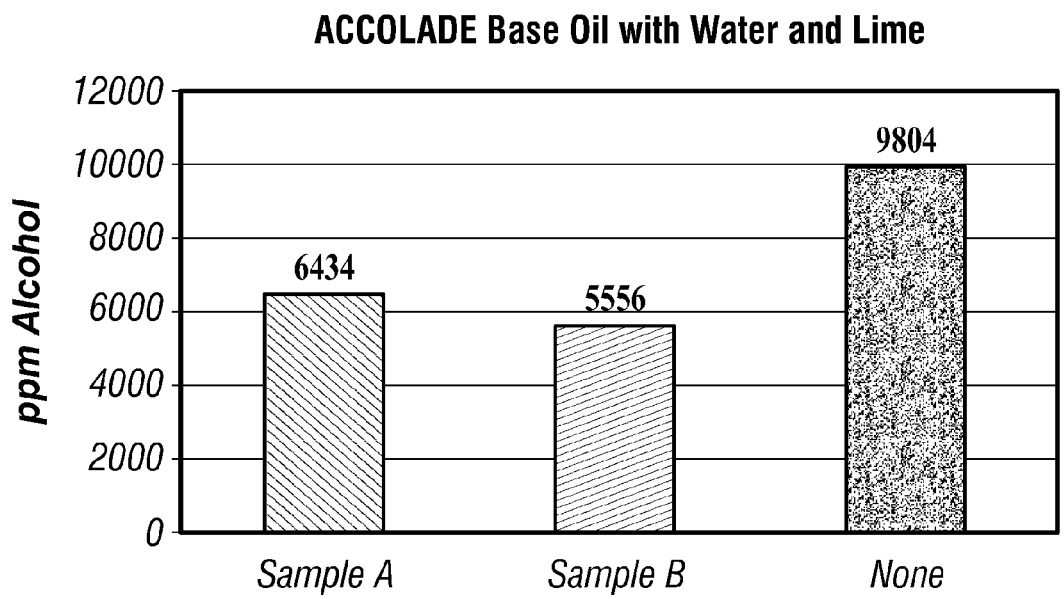
FIG. 3 is a graph comparing the amount of alcohol produced, indicating hydrolysis, in samples containing ester base, water, and lime, with and without polycarbodiimide additives, after heating at 370° F. for 16 hours.

The data is also graphed in FIG. 3. This data shows that a significant reduction in hydrolysis is obtained with the polycarbodiimide additives, even in the presence of lime, and even though the addition of lime to a drilling fluid typically increases the amount of hydrolysis due to the presence of greater concentrations of the more nucleophilic hydroxide ion. The percent reductions in hydrolysis in the samples with the polycarbodiimide additives when compared to the control were 34.4% in the case of polycarbodiimide Sample A and 43.3% in the case of polycarbodiimide Sample B.

Experiment 4:

Samples containing ACCOLADE® invert emulsion drilling fluid were formulated with and without 5 lb/bbl loading of one of two commercial polycarbodiimides, STABAXOL® P200 and STABAXOL® P polycarbodiimides, available from Rhein Chemie Rheinau GmbH, Mannheim, Deutschlandas, as indicated in Table 4.

TABLE 4

| | Polycarbodiimide Sample | | |
|---|---|---|---|
| | A | B | None (Control) |
| ACCOLADE ® base, bbl | 0.519 | 0.519 | 0.519 |
| 250,000 ppm CaCl$_2$ brine, bbl | 0.0676 | 0.0676 | 0.0676 |
| LE SUPERMUL ® polyaminated fatty acid, lb | 10 | 10 | 10 |
| FACTANT ® highly concentrated tall oil derivative, lb | 1 | 1 | 1 |
| ADAPTA ® methylstyrene/acrylate copolymer for HPHT filtration control, lb | 3 | 3 | 3 |
| Rev Dust, lb | 20 | 20 | 20 |
| Barite, lb | 497 | 497 | 497 |
| Polycarbodiimide Sample A, lb | 5 | 0 | 0 |
| Polycarbodiimide Sample B, lb | 0 | 5 | 0 |

All trademarked products are available from Halliburton Energy Services, Inc. in Houston, Texas and Duncan, Oklahoma.

The samples were hot rolled at 150° F. for 16 hours and then were tested for alcohol concentration. The samples were hot rolled further at 370° F. for 16 additional hours and tested for alcohol, as shown in Table 5.

TABLE 5

| Additive | wt. % alcohol | ppm alcohol |
|---|---|---|
| Polycarbodiimide Sample A hot rolled at 150° F. | 0.04 | 416 |
| Polycarbodiimide Sample B hot rolled at 150° F. | 0.03 | 277 |
| None (Control) hot rolled at 150° F. | 0.06 | 626 |
| Polycarbodiimide Sample A hot rolled at 370° F. | 0.71 | 7129 |
| Polycarbodiimide Sample B hot rolled at 370° F. | 0.09 | 871 |

TABLE 5-continued

| Additive | wt. % alcohol | ppm alcohol |
|---|---|---|
| None (Control) hot rolled at 370° F. | 0.78 | 7761 |

Figure 4:
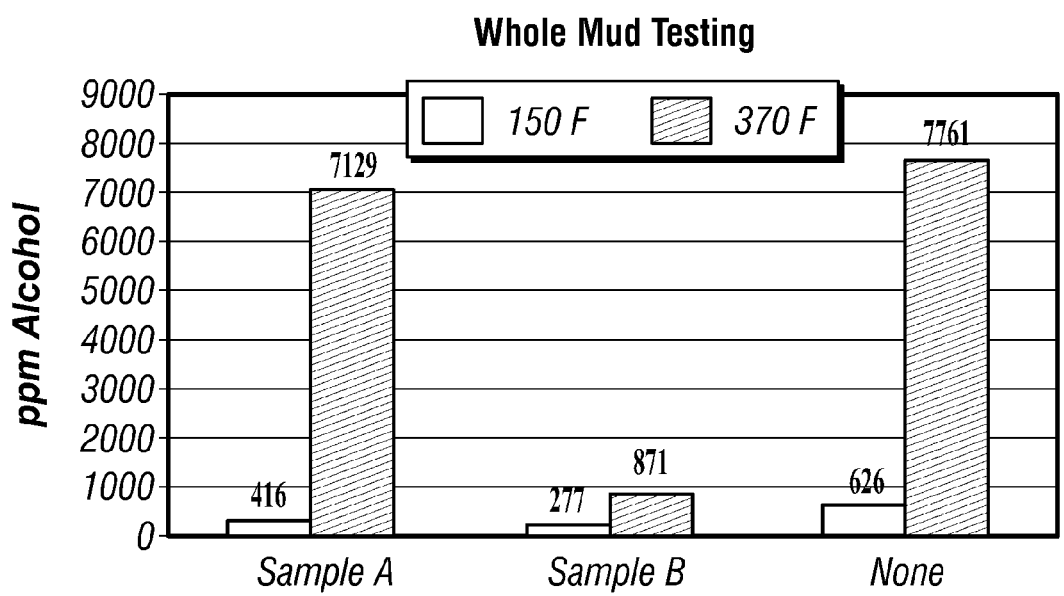
FIG. 4 is a graph comparing the amount of alcohol produced, indicating hydrolysis, in samples of an ester based invert emulsion drilling fluid, with and without polycarbodiimide additives, after hot rolling at 150° F. for 16 hours and then at 370° F. for 16 hours.

This data is also graphed in FIG. 4. The data shows that the percent reduction in hydrolysis with the polycarbodiimide additive Sample B, when compared to the control, was 89% over the control after aging at 370° F. Sample A did not perform as well in the whole mud, possibly because the material was wetted onto solids that were present in the fluid.

Although the experiments were conducted with an ACCOLADE® ester base and an ACCOLADE® invert emulsion drilling fluid, benefits of the invention may be seen with other ester based drilling fluids. Some other examples of commercial ester based invert emulsion drilling fluids include, without limitation, PETROFREE®, PETROFREE® LV, and PETROFREE® SF drilling fluids available from Halliburton Energy Services, Inc. in Houston, Tex. Still further examples are taught in U.S. Pat. No. 7,485,602, issued Feb. 3, 2009, to Jeff Kirsner, et al, and in U.S. Pat. No. 7,456,135, issued Nov. 25, 2008 to Jeff Kirsner, et al., among many other examples. Also, drilling fluids having an amide base or other base vulnerable to hydrolysis may benefit from addition of a carbodiimide or polycarbodiimide as a hydrolysis inhibitor.

Further, the invert emulsion drilling fluids of the invention or for use in the present invention have added to them or mixed with their invert emulsion base, other fluids or materials needed to comprise complete drilling fluids. Such materials may include, for example: additives to reduce or control temperature rheology or to provide thinning, for example, additives having the tradenames COLDTROL®, ATC®, and OMC2™; additives for enhancing viscosity, for example, an additive having the tradename RHEMOD L™; additives for providing temporary increased viscosity for shipping (transport to the well site) and for use in sweeps, for example, an additive having the tradename TEMPERUS™ (modified fatty acid); additives for filtration control, for example, an additive having the tradename ADAPTA® (methylstyrene/acrylate copolymer); additives for high temperature high pressure control (HTHP) and emulsion stability, for example, an additive having the tradename FACTANT™ (highly concentrated tall oil derivative); additives for emulsification, for example, an additive having the tradename LE SUPERMUL™ (polyaminated fatty acid); and additives for thinning, for example additives having the tradenames COLDTROL® (alcohol derivative), OMC2™ (oligomeric fatty acid), and ATC® (modified fatty acid ester) and example additives taught in U.S. Pat. No. 7,435,706, issued Oct. 14, 2008 to Heinz Mueller, et al. and in U.S. patent application Ser. No. 10/432,786, filed Dec. 10, 2003 of Heinz Mueller, et al., both entitled "Thinners for Invert Emulsions." All of the aforementioned trademarked products are available from Halliburton Energy Services, Inc. in Houston, Tex., U.S.A. Additionally, the fluids may comprise an aqueous solution containing a water activity lowering compound, composition or material, comprising the internal phase of the invert emulsion. Such solution may be a saline solution comprising calcium chloride (typically about 25% to about 30%, depending on the subterranean formation water salinity or activity), although other salts or water activity lowering materials known in the art may alternatively or additionally be used.

Many other examples of drilling fluid components will be readily known to those of skill in the art. Also known is that such components may include an ester or an amide, known to be vulnerable at least at high temperatures to hydrolysis. For example, LE SUPERMUL®, EZ® MUL, EZ MUL® NT, EZ MUL® NS, DRILTREAT®, INVERMUL®, INVERMUL® NT and ADAPTA® additives are emulsifiers and fluid loss control additives that contain esters or amides. Adding a carbodiimide, preferably a polycarbodiimide, to the drilling fluid according to the present invention enhances the stability of such additives, and consequently enhances the stability of the drilling fluid overall. That is, the carbodiimide inhibits hydrolysis of the ester or amide in such additives. Thus advantages may be realized by adding a carbodiimide or polycarbodiimide to a drilling fluid containing ester or amide additives even when the base oil of the drilling fluid may not comprise an ester or amide.

The exact formulations of drilling fluids used in drilling boreholes vary with the particular requirements of the subterranean formation. The above listed additives, however, provide some examples. A preferred example drilling fluid of the present invention may have the formulation used in Experiment 4 discussed above. A couple of other preferred example drilling fluids of the present invention have the following example formulations set forth in Table 6 below.

TABLE 6

Example Formulations

| Fluids and Compounds | ACCOLADE ® Invert Emulsion Drilling Fluid | PETROFREE ® SF Invert Emulsion Drilling Fluid |
|---|---|---|
| ACCOLADE ® Base (bbl) | 0.590 | — |
| PETROFREE ® SF BASE (bbl) | — | 0.568 |
| LE MUL ™[1] (lb.) | — | 4 |
| LE SUPERMUL ™[2] (lb.) | 10 | 6 |
| Lime (lb.) | 1 | 4 |
| DURATONE ® HT[3] (lb.) | — | 4 |
| Freshwater (bbl) | 0.263 | 0.254 |
| ADAPTA ®[4] (lb.) | 2 | — |
| RHEMOD L ™[5] (lb.) | 1 | — |
| GELTONE ® II[6] (lb.) | — | 5 |
| VIS-PLUS ®[7] (lb.) | — | 1.5 |
| BAROID ®[8] (lb.) | 138 | 138 |
| Calcium chloride (lb.) | 32 | 31 |
| DEEP-TREAT ®[9] (lb.) | — | 2 |
| Polycarbodiimide (lb.) | 5 | 5 |

[1]Blend of oxidized tall oil and polyaminated fatty acid emulsion stabilizer.
[2]Polyaminated fatty acid emulsifier.
[3]Organophilic leonardite filtration control agent.
[4]Copolymer HTHP filtration control agent for non-aqueous systems.
[5]Modified fatty acid suspension agent/viscosifier.
[6]Organophilic clay viscosifier.
[7]Carboxylic acid suspension agent.
[8]Ground barium sulfate weighting agent.
[9]Sulfonate sodium salt wetting agent/thinner.

All trademarked products in Table 6 are available from Halliburton Energy Services, Inc. in Houston, Tex., including: LE MUL™ emulsion stabilizer (a blend of oxidized tall oil and polyaminated fatty acid); LE SUPERMUL™ emulsifier (polyaminated fatty acid); DURATONE® HT filtration control agent (organophilic leonardite); ADAPTA® filtration control agent (methylstyrene/acrylate copolymer particularly suited for providing HPHT filtration control in non-aqueous fluid systems); RHEMOD L™ suspension agent/viscosifier (modified fatty acid); GELTONE® II viscosifier (organophilic clay); VIS-PLUS® suspension agent (carboxylic acid); BAROID® weighting agent (ground barium sulfate); and DEEP-TREAT® wetting agent/thinner (sulfonate sodium salt).

Examples of preferred commercially available polycarbodiimides useful in the formulations set forth in Table 6 include, without limitation, STABAXOL® I, STABAXOL® P, and STABAXOL® P200 polycarbodiimides, all available from Rhein Chemie Rheinau GmbH, Mannheim, Deutschlandas (Germany).

The preferred formula for carbodiimides for use in the present invention is as follows:

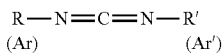

where R and R' are the same or different and are selected from the group consisting of aromatic groups and straight chain, branched, and cyclic alkyl groups, alkenyl groups, and alkynl groups. Alkyl and aromatic groups are more preferred than alkynl or alkenyl groups. Aromatic polycarbodiimides are preferred over straight chain, branched, or cyclic polycarbodiimides, although straight chain, branched, or cyclic polycarbodiimides can be used in the invention. Polymeric carbodiimides are preferred over carbodiimides. Preferably R has $C_1$ to $C_{30}$ carbon atoms, and generally polycarbodiimides having a molecular weight in the range of about 500 to about 10,000 g/mol will be preferred for use in the present invention.

Further carbodiimides believed to have utility in the present invention are described in U.S. Pat. No. 6,498,225 and in U.S. Pat. No. 5,360,888, for example. U.S. Pat. No. 6,498,225 specifically teaches polycarbodiimide-based copolymers having the general formula:

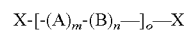

where:

X is identical or different and is selected from the group consisting of NHCO—R''', —NHCONH—R''', —NH-COO—R''', —NHCOS—R''', —COO—R''', —O—R''', NR$_2$, —S—R''', —OH, —S—H, —NH$_2$, —NHR''', and —NCO, and wherein the group R''' denotes an alkyl, cyclcoalkyl, aralkyl or aryl radical containing 1 to 30 carbon atoms;

m, n are independent of one another and are each an integer from 1 to 1000;

o is an integer from 1 to 500;

A is selected from the group consisting of the carbodiimides or polycarbodiimides of the formula: —(—N═C═N—Y—)— where Y is selected from the group consisting of ortho- or bisortho-substituted aromatics, aralkylenes in which the carbon atom linked to the carbodiimide group is substituted by $C_1$ to $C_{14}$-alkyl groups, and cycloalkylenes in which the carbon atom linked to the carbodiimide group is substituted by $C_1$ to $C_{14}$-alkyl groups; and B is selected from the group consisting of (poly)diioles, (poly)diamines, (poly)dimercaptans, (poly)aminoalcohols, (poly)aminomercaptans and (poly)mercaptoalcohols. U.S. Pat. No. 5,360,888 teaches polycarbodiimides that are reaction products of substituted aromatic isocyanates, such as: 2,6-diisopropylphenyl isocyanate; 1,3,5-triisopropyl-2,4,-diisocyanatobenzene; naphthalene-1,5-diissocyanate; 2,4-diissocyanato-3,5-dimethyltoluene; 4,4'-methylenebis (2,6-diethylphenyl isocyanate); 4,4'-methylenebis(2-ethyl-6-methylphenyl isocyanate); 4,4'-methylenebis (2-isopropyl-6-methylphenyl isocyanate); 4,4'-methylenebis(2,6-diisopropylphenyl isocyanate); and 4,4'-methylenebis(2-ethyl-6-methylcyclohexyl isocyanate).

As indicated above, the advantages of the invention may be obtained by employing a drilling fluid of the invention, comprising or containing an ester or amide, in drilling operations, wherein the drilling fluid has added thereto a carbodiimide, preferably a polycarbodiimide. The drilling operations—whether drilling a vertical or directional or horizontal borehole, conducting a sweep, or running casing and cementing—may be conducted as known to those skilled in the art with other drilling fluids. That is, a drilling fluid of the invention is prepared or obtained and circulated through a wellbore as the wellbore is being drilled (or swept or cemented and cased) to facilitate the drilling operation. The drilling fluid removes drill cuttings from the wellbore, cools and lubricates the drill bit, aids in support of the drill pipe and drill bit, and provides a hydrostatic head to maintain the integrity of the wellbore walls and prevent well blowouts. The specific formulation of the drilling fluid in accordance with the present invention is optimized for the particular drilling operation and for the particular subterranean formation characteristics and conditions (such as temperatures). For example, the fluid is weighted as appropriate for the formation pressures and thinned as appropriate for the formation temperatures. Further, the fluids of the invention may be recycled during a drilling operation such that fluids circulated in a wellbore may be recirculated in the wellbore after returning to the surface for removal of drill cuttings for example. The drilling fluid of the invention may even be selected for use in a drilling operation to comply with environmental regulations governing drilling operations in a particular subterranean formation.

The foregoing description of the invention is intended to be a description of preferred embodiments. Various changes in the details of the described fluids and methods of use can be made without departing from the intended scope of this invention as defined by the appended claims.

What is claimed is:

1. An oil based drilling fluid with enhanced stability for drilling a borehole in a subterranean formation having temperatures in the range of about 275° F. to about 450° F., comprising:
   an oil base that is 50 to approximately 100 percent by liquid volume of the fluid; and
   a stabilizer consisting of a carbodiimide, wherein the carbodiimide enhances the stability of the drilling fluid during drilling of the borehole, such that the drilling fluid is stable at temperatures in the range of about 275° F. to about 450° F.

2. The drilling fluid of claim 1 wherein the carbodiimide has the formula:

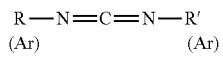

where R and R' are the same or different and are selected from the group consisting of aromatic groups and straight chain, branched, and cyclic alkyl groups, alkenyl groups, and alkynl groups.

3. The drilling fluid of claim 2 wherein R has $C_1$ to $C_{30}$ carbon atoms.

4. The drilling fluid of claim 2 wherein R' has $C_1$ to $C_{30}$ carbon atoms.

5. The drilling fluid of claim 1 wherein the carbodiimide is a polymer.

6. The drilling fluid of claim 1 wherein the carbodiimide is monomeric.

7. The drilling fluid of claim 1 wherein the carbodiimide is a hydrolysis inhibitor and is in an amount of less than or about 5 lb/bbl loading amount.

8. The drilling fluid of claim 1 wherein the carbodiimide has a molecular weight in the range of about 500-10,000 g/mol.

9. The drilling fluid of claim 1 wherein the drilling fluid further comprises an additive comprising an ester.

10. The drilling fluid of claim 9 wherein the additive is an emulsifier.

11. The drilling fluid of claim 1 wherein the drilling fluid further comprises an additive comprising an amide.

12. The drilling fluid of claim 1 wherein the drilling fluid further comprises water.

13. An invert emulsion based drilling fluid with enhanced stability for drilling a borehole in a subterranean formation having temperatures in the range of about 275° F. to about 450° F., consisting of:
   a continuous oil phase comprising 50 to approximately 95 percent by liquid volume of the fluid;
   an internal phase;
   an emulsifier;
   a filtration control agent;
   a weighting agent;
   a stabilizer consisting of a carbodiimide in a 5 lb/bbl loading amount such that the drilling fluid is stable at temperatures in the range of about 275° F. to about 450° F., and
   optionally one or more additives from the group consisting of: a suspension agent; a viscosifier; a thinner; a temperature control agent; a rheology modifier; a high temperature high pressure control additive; and an emulsion stabilizer.

14. The drilling fluid of claim 13 wherein the continuous phase comprises an ester based invert emulsion.

15. The drilling fluid of claim 13 wherein the emulsifier comprises an ester or an amide.

16. The drilling fluid of claim 13 wherein the filtration control agent comprises an ester or an amide.

17. The drilling fluid of claim 13 wherein the carbodiimide is a polycarbodiimide, having a molecular weight in the range of 500 to about 10,000.

18. The drilling fluid of claim 13 wherein the wherein the carbodiimide has the formula:

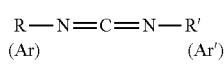

where R and R' are the same or different and are selected from the group consisting of aromatic groups and straight chain, branched, and cyclic alkyl groups, alkenyl groups, and alkynl groups.

* * * * *